INVENTORS
Fred S. Sadler
Frank W. Heinrichs
BY Andrus, Sceales, Starke & Sawall
Attorneys

3,736,178
CELLULOSE MATERIAL TREATED WITH A CELLULOSE DERIVATIVE, DIGLYCOLAMINE AND AN ALKYLKETENE DIMER

Fred S. Sadler, Racine, Wis., and Frank W. Heinrichs, McMurray, Pa., assignors to McGraw-Edison Company, Milwaukee, Wis.
Filed Jan. 14, 1971, Ser. No. 106,506
Int. Cl. D21h 1/42
U.S. Cl. 117—157      2 Claims

ABSTRACT OF THE DISCLOSURE

Cellulose material having improved physical properties and having particular application as insulation in electrical apparatus. The cellulose material, such as 100% Kraft fiber paper, is treated with a combination of a cellulose derivative, diglycolamine and an alkylketene dimer. The treatment with this combination of ingredients improves the thermal stability of the cellulose material with significantly lower dielectric loss characteristics, as well as improving the mechanical properties of the material.

BACKGROUND OF THE INVENTION

The invention relates to cellulose materials having improved thermal stability and in particular to cellulosic materials to be used as insulation in electrical apparatus.

Cellulose fiber materials tend to deteriorate when subjected to elevated temperatures for extended periods of time resulting in a progressive reduction in their strength until eventually they fracture. When used in an electrical apparatus, the deterioration of the cellulose is accelerated by other factors, particularly where the insulation is in contact with, or immersed in, a liquid dielectric such as transformer oils. The elevated temperatures may cause the liquid dielectrics to break down into their chemical constituents and the resultant deterioration products may in turn attack the cellulose fiber material.

The problem of deterioration of cellulose fiber material at elevated temperatures is also encountered when using cellulose fiber cord reinforcing in rubber articles such as pneumatic tires, steam hoses, conveyor belts and the like. In this situation, the cellulose fiber reinforcement, which is subjected to elevated temperatures either from external heat or from heat generated internally by reason of repeating flexing, as in the case of pneumatic tires, tends to deteriorate, resulting in a progressive reduction in the strength of the cellulose fiber reinforcement.

Electrical induction apparatus employing conductors insulated with cellulosic fibrous insulation in combination with liquid dielectrics presently utilize paper containing manilla ropefibers and Kraft process wool pulp in various blends. This insulation may also be thermally upgraded by chemical treatment to permit the equipment to operate at higher temperatures.

It is well known to those skilled in the art that 100% Kraft paper, which contains no blends of Manilla rope or other high strength fibers, has 15 to 20% greater impulse dielectric strength than Kraft paper blended with the higher strength fibers. However, presently known methods of application preclude the eonomical use of 100% Kraft paper as turn insulation for conductors. This is due to the inherent brittleness and inextensibility of pure Kraft paper sheets, properties which prevent the use of magnet wire wrapping equipment that imposes severe vibration, tensile elongations, edge tearing and edge tear toughness loads. Thus, to improve the characteristic called runability on existing wire wrapping equipment, longer and finer fibers such as rope fibers, sisal, or ramie are blended into the Kraft stock.

The addition of these longer, higher strength fibers to the turn insulation has been necessary in the past because the magnet wire used in power transformers is insulated by winding the turn insulation helically on machines running at high speed and often at high tension. These conditions require the turn insulation to have high machine direction tensile strength and elasticity, as well as high cross machine tear strength. The addition of the longer, higher strength fibers to the Kraft stock does not noticeably improve the physical properties of the paper, but does result in a paper or insulation which can be wrapped at high speeds and at high tension.

Furthermore, the addition of chemical additives to provide thermal stability noticeably degrades the intrinsic mechanical strength of all cellulosic paper. The chemical additives also contribute significantly to the dielectric losses in the paper, in particular to those loss components affected by both temperature and voltage stress. This characteristic is especially critical in high voltage and EHV transformers and induction devices operating at high electrical field strengths or in the vicinity of the insulated conductors. The effect of the chemical stabilizer is to increase the temperature of the dielectric as the loss factor increases due to its dependence on temperature and stress. This escalating effect can lead to temperature instability called "run away" which produces localized hot spots and burning which in turn can lead to major failure of the insulation.

SUMMARY OF THE INVENTION

The invention is directed to a process of treating cellulose fiber material, and particularly 100% Kraft fiber paper, to improve its thermal stability, without undue sacrifice of the initial physical properties of the untreated paper, thereby making it possible to utilize the treated paper with high speed winding equipment.

In accordance with the invention, the cellulose fiber material is treated with an aqueous solution containing the combination of a cellulose derivative, diglycolamine and an alkylketene dimer. In this combination the cellulose derivative acts as a film former to increase the bond between the cellulose fibers, while the diglycolamine contributes to thermal stability and the alkylketene dimer provides water repellency and lubricity for the treated material.

The treatment of the invention improves the thermal stability of the paper without sacrificing more than 10% of the initial mechanical strength of the untreated paper. This enables 100% Kraft paper treated by the process of the invention to be employed on conventional high speed wire wrapping equipment.

The improved thermal stability is achieved with significantly lower dielectric loss characteristics than heretofore possible with stabilized treating formulations. The treated 100% Kraft paper also has superior impulse dielectric strength, approximately 15% greater than thermally stabilized blends of Kraft and high strength fibers.

In addition, the treated paper has improved initial edge tear and edge tear toughness characteristics, and better retention of these properties after extended aging, than existing thermally stabilized blends of Kraft and high strength fibers.

Other objects and advantages will appear in the course of the following description.

The drawings illustrate the best mode presently contemplated of carrying out the invention.

Figure 1:
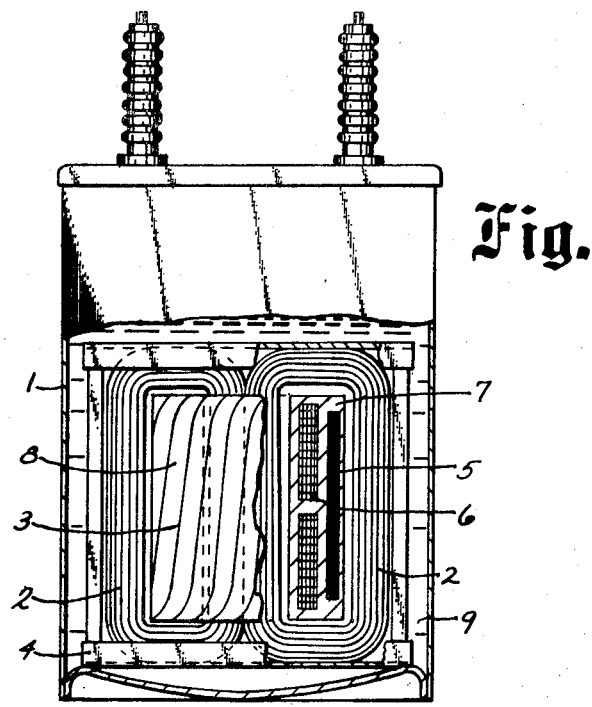
FIG. 1 is a sectional view of a transformer embodying cellulose insulation which has been treated in accordance with the invention.

The transformer, as shown in FIG. 1, is encased within a tank 1 and consists of a magnetic core 2 and a coil 3, both of which are supported in spaced relation from the bottom of the tank 1 by channel support members 4, or the like. The coil 3 comprises a high voltage winding 5 and a low voltage winding 6 which are insulated from one another by the treated cellulose insulation 7. A treated cellulose wrapping 8 may also be applied to the exterior of the coil 3. A dielectric liquid 9 comprising oil, chlorinated diphenyl, or the like, is disposed within the tank 1 to cover the core 2 and the coil 3 in order to insulate them and to dissipate the heat generated during operation.

The cellulose fiber material to be used as the layers 7 and 8 can be Kraft paper, cotton, linen or other common cellulose materials commonly used as insulation material in electrical apparatus. The invention has particular application to 100% Kraft fiber paper without the addition of other fiber blends, such as rope fiber, sisal, ramie, and the like.

In accordance with the invention, the cellulose material is treated with a combination of a cellulose derivative, diglycolamine and an alkylketene dimer, which serve to improve the thermal stability of the cellulose, as well as providing a substantial improvement in other physical properties.

The cellulose derivative may take the form of hydroxypropyl cellulose or hydroxyethyl cellulose. These materials are non-ionic, water soluble cellulose ethers, having an average molecular weight in the range of 75,000 to 900,000. The cellulose derivative serves as a film former, acting to bind the cellulose fibers together, and also contributes to the heat stability of the treated cellulose.

The diglycolamine or 2(2-aminoethoxy)ethanol, is an essentially colorless, slightly viscous liquid with a mild amine odor. It is miscible with water and alcohol, but is relatively insoluble with aromatic and aliphatic hydrocarbons. The diglycolamine contributes primarily to the improvement to the thermal stability of the cellulose material.

The alkylketene dimer has the following formulation:

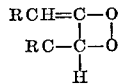

where R is selected from the group consisting of tetradecyl or hexadecyl. The alkylketene dimer is normally applied as a water emulsion with a small amount of cationic starch derivative which serves as a protective colloid but does not enter into the reaction mechanism. Under neutral or alkaline conditions, the alkylketene dimer will react with the hydroxyl groups on the cellulose to form an ester which is water repellent and chemically inert. As a result of this reaction, a paper surface is produced with a low friction angle, meaning that the paper has a relatively slippery surface which facilitates the winding operation. The precise reaction mechanism is not completely understood, but it is believed that there are also reactions between both the cellulose derivative and the diglycolamine and the hydroxyl groups of the cellulose, as well as inter-reactions between the ingredients of the treating solution.

The active ingredients are preferably applied to the cellulose fiber material in the form of an aqueous solution. While an aqueous treating solution is the most practical, other types of evaporable solvents or carriers can be substituted for water and in some cases the cellulose material may be treated with the pure active ingredients without solution, or treated with a dispersion of the above ingredients. To prepare the treating solution, the cellulose derivative, diglycolamine and the alkylketene dimer are added to the water and held at an elevated temperature of about 85° C. to 90° C. with stirring for a minimum of about 20 minutes to obtain solution.

The fibers can be impregnated in any suitable manner, such as by immersing the fibers in the treating solution for a time sufficient to fully impregnate the fibers, or by spraying, brushing, dipping, size pressing, or the like. It is important that all of the individual fibers or filaments of the cellulose material be impregnated with the treating solution so that each individual cellulose fiber is able to react with the active ingredients. Impregnation differs from surface coating in which only the outer surface of the fibrous material is coated with the active ingredients and the individual fibers on the interior of the material are generally uncoated.

The impregnation of the cellulose fiber material can be carried out at room temperature or elevated temperatures up to the boiling point of the solution employed. The time of contact between the cellulose fibers and the solution should be sufficient to permit penetration or impregnation of the fibers. Generally, a contact time of about 15 seconds to 10 minutes is adequate for impregnation, although more rapid impregnation, such as obtained in a size press or a paper machine, or longer periods of impregnation may be employed without adverse effects.

The concentration of the active ingredients in the solution may vary considerably depending on the end use of the cellulose material and the method of application. It is somewhat more difficult to achieve the desired impregnation using very dilute solutions as compared to more concentrated solutions, but in general, solutions containing from 0.5 to 10.0% by weight of total active ingredients can be employed. It has been found that a solution containing from 0.5% to 10% by weight of the cellulose derivative, from 1% to 10% by weight of the diglycolamine and 0.02 to 2.0% by weight of the alkylketene dimer is satisfactory.

The weight relationship between the active ingredients is important to the treatment. It has been found that the diglycolamine should be used in a weight ratio of 2 to 4 parts per one part of the cellulose derivative and the alkylketene dimer should be used in a weight ratio of 0.10 to 2.0 parts per one part of cellulose derivative, based on 100% active ingredients. The preferred weight relationship between the cellulose derivative, the diglycolamine and the alkylketene dimer is 1:2:1.

After evaporation of the water or other carrier from the treating solution, the dried paper should contain from 0.2% to 1.25%, and preferably from 0.50% to 0.55%, by weight of nitrogen. The nitrogen content is contributed by the diglycolamine.

As previously noted, the invention is particularly applicable to the treatment of 100% Kraft process wood fiber paper and results in a treated paper having a markedly reduced dielectric constant when impregnated with transformer oil as compared with other thermally stabilized cellulose materials. The treated pure Kraft fiber paper has the necessary mechanical characteristics to permit use on conventional high speed wire wrapping equipment.

The following example illustrates the process of the invention:

EXAMPLE NO. I

A series of samples of 100% Kraft fiber paper 8 inches x 8 inches and 2.5-mil thick were immersed in a treating solution containing 2.17% hydroxypropyl cellulose, 4.35% diglycolamine and 1.10% alkylketene dimer (Aquapel 360, Hercules, Inc.), with the balance water. The sheets were retained within the treating solution until they were thoroughly impregnated. The sheets were then removed from the solution and allowed to air dry at room temperature. The dried paper contained 0.54% by weight of nitrogen.

The impregnated sheets of paper were then placed in glass tubes containing insulated copper wire 21 inches long and copper foil (10½ sq. inch). Each paper-copper system was placed in an oven at 135° C. for 16 hours and during this period a pressure of 0.1 mm. was maintained in the tubes. The evacuated tubes were then filled under vacuum with an inhibited transformer oil leaving an air space in the tube of approximately 15% of the total volume. The air space was then filled to one atmosphere pressure with dry clean air. The tubes were then sealed, and a series of the tubes were placed in an oven and aged at 170° C. for 120 hours, while a second series of samples were maintained in the oven at 170° C. for 288 hours.

At the completion of the aging period, the tubes were opened and the physical properties of the paper samples were determined. These properties are compared with untreated paper aged under the same conditions. The results are shown in the following table:

TABLE I

| Sample | Hrs. at 170° C. | Percent Tensile strength retained | Fold endurance-double folds | Percent toughness retained |
|---|---|---|---|---|
| Untreated | 0 | 100.0 | 430 | 100.0 |
| Do | 120 | 46.8 | 0 | 18.1 |
| Do | 288 | 29.7 | 0 | 7.6 |
| Treated | 0 | 100.0 | 3.4 | 100.0 |
| Do | 120 | 76.2 | 31 | 59.2 |
| Do | 288 | 72.7 | 2 | 43.4 |

In the above table the percent tensile strength retained, is the percentage value of the tensile strength of the aged paper compared with that of unaged paper. The fold endurance is a measure of brittleness of the paper and indicates the number of double folds (180° fold) that the paper was subjected to before fracturing, while the percent toughness retained is a percentage value of the toughness of the aged paper compared with that of the unaged paper.

From the above table it can be seen that 100% Kraft fiber paper treated in accordance with the invention substantially improved the tensile strength retention, the fold endurance and the toughness retention over the similarly aged, but untreated paper.

The unaged, untreated and treated samples were also subjected to a Finch edge tear test in which the force required to tear the paper in a cross machine direction was measured. In this test, the force required to tear the untreated paper was 1302 grams as compared to 1672 grams for the treated paper. This test result illustrates the marked improvement in tear resistance of the treated paper over that of the untreated paper.

The electrical properties of 100% Kraft paper treated in accordance with the procedure outline above (hereinafter referred to as Sample A), were compared with those of (i) an untreated control sample composed of 100% Kraft fiber and (ii) a sample composed of 60% manilla fiber and 40% Kraft fiber impregnated with a treating solution containing 4% by weight of diglycolamine and 1% pentaerythritol and in the dried state containing 0.40% by weight of nitrogen (Sample B).

The samples were convolutely wound into a capacitor type test specimen and vacuum impregnated with transformer oil (Kaydol 350) and tested on a Hartmann-Braun high voltage bridge at 300 volts per mil.

Figure 2:
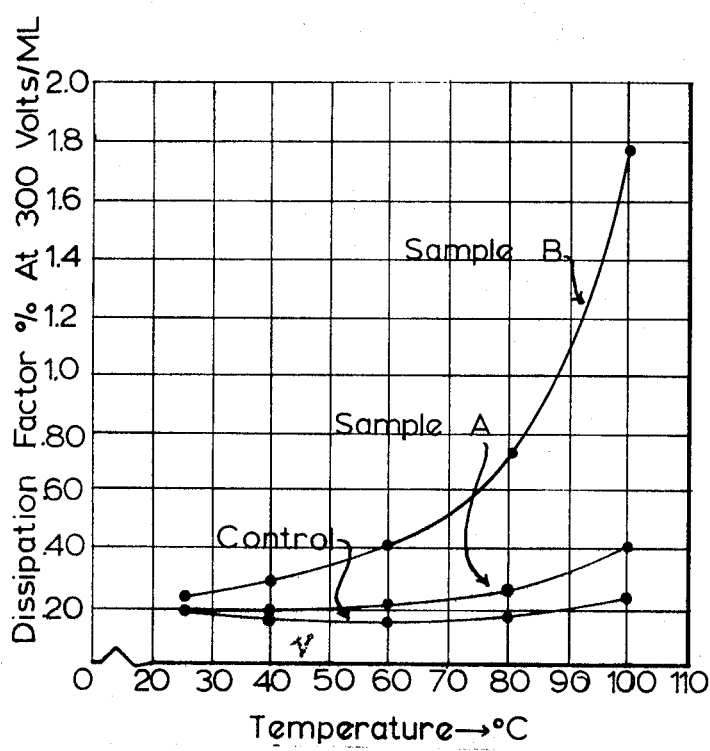
FIG. 2 is a curve showing the dissipation factor at various temperatures for treated and untreated cellulose materials.

The dissipation factors for the three specimens were determined at temperatures in the range of 25° C. to 100° C. and FIG. 2 are curves showing the affect of temperatures on the dissipation factor of these specimens. From the curves, it can be seen that the dissipation factor of Sample A more nearly approaches that of the control than does Sample B. For example, at 80° C. the dissipation of the control sample was 0.19%, while that of Sample A was 0.27% and that of Sample B was 0.74%. It was also found that the relative dielectric constant (S.I.C.) of each sample was different and these factors resulted in different power dissipations when operated at the same electrical stress. These values are shown in the following table:

TABLE II

| Sample | Dissipation factor at 80° C., 300 v./mil, percent | S.I.C., st., 80° C. | Power loss, control=1.00 |
|---|---|---|---|
| Control | 0.9 | 2.84 | 1.00 |
| A | 0.27 | 2.76 | 1.38 |
| B | 0.74 | 3.26 | 4.46 |

As shown in Table II a value of 1.00 was selected for the power loss of the control sample at 80° C. and 300 v./mil, and relative values of 1.38 and 4.46 were calculated for Samples A and B, respectively, thereby indicated that the power loss for Sample B, composed of 60% manilla fiber and 40% Kraft fiber and treated with diglycolamine and pentaerythritol, was 4.46 times greater than the control, while that of Sample A, treated in accordance with the invention, was only 1.38 times greater than the control.

This test clearly illustrates the improvement in electrical properties achieved by the treatment of the invention.

Various modes of carrying out the invention are contemplated as being within the scope of the following claims particularly pointing out and distinctly claiming the subject matter which is regarded as the invention:

We claim:

1. A treated cellulose fiber product, comprising a cellulose fiber base impregnated with the combination of (i) a cellulose derivative selected from the group consisting of hydroxypropyl cellulose, hydroxyethyl cellulose, and mixtures thereof, (ii) diglycolamine, and (iii) an alkyl ketene dimer, selected from the group consisting of tetradecyl ketene dimer and hexadecyl ketene dimer, said cellulose base containing from 0.20% to 1.25% by weight of nitrogen, and said diglycolamine is present in a weight ratio of 2 to 4 parts per one part of said cellulose derivative and said alkylketene dimer is present in a weight ratio of 0.10 to 2 parts per one part of said cellulose derivative.

2. The product of claim 1, wherein said base is 100% Kraft process wood fiber paper.

References Cited

UNITED STATES PATENTS

| 2,762,270 | 9/1956 | Keim et al. | 117—157 X |
| 2,627,477 | 2/1953 | Downey | 117—157 X |
| 2,129,157 | 9/1938 | Trolander et al. | 174—121 |
| 3,403,968 | 10/1968 | Brummet et al. | 8—116.2 |

WILLIAM D. MARTIN, Primary Examiner

M. R. LUSIGNAN, Assistant Examiner

U.S. Cl. X.R.

117—154, 166; 174—121 B, 121 R